June 15, 1943.                M. KATCHER                    2,321,821
                DRIVEN MEMBER FOR FRICTION CLUTCHES
                    Filed Oct. 4, 1939          2 Sheets-Sheet 1
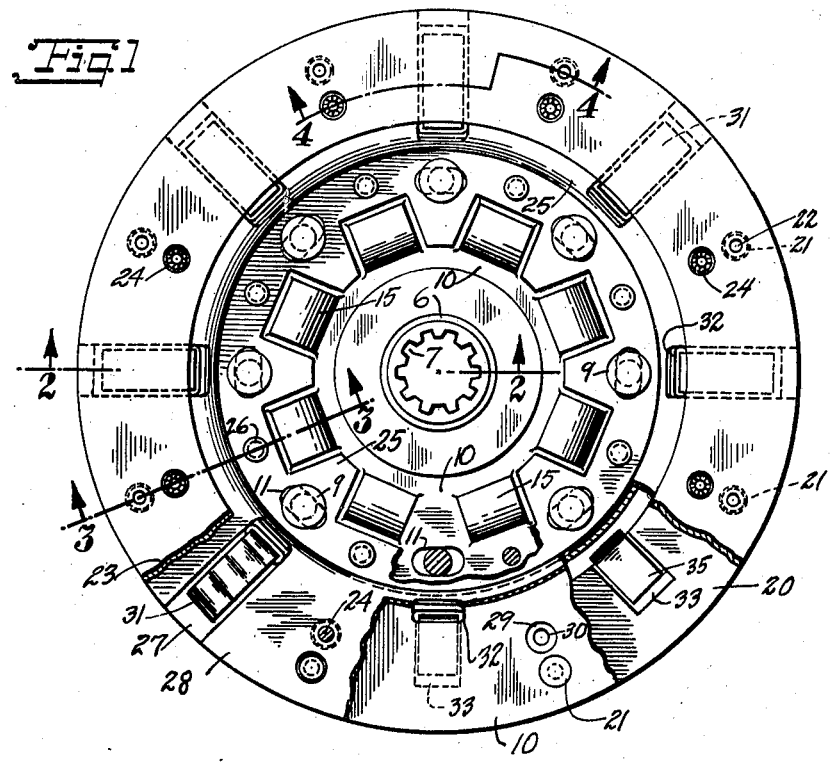
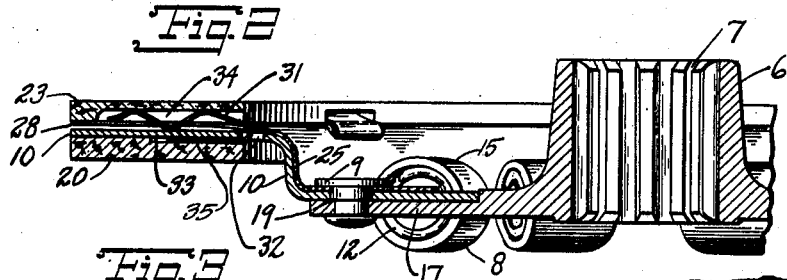
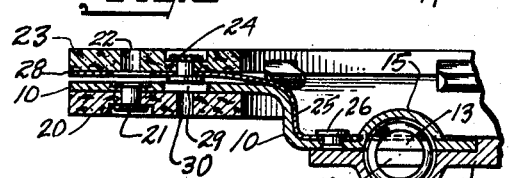
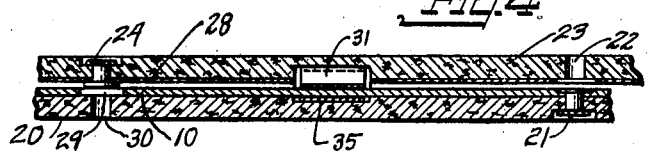
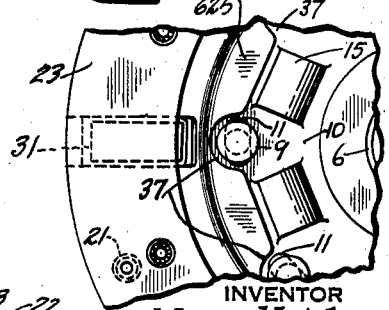
INVENTOR
Morris Katcher
BY
Emanuel Scheyer
ATTORNEY

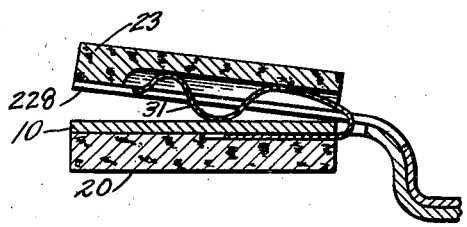
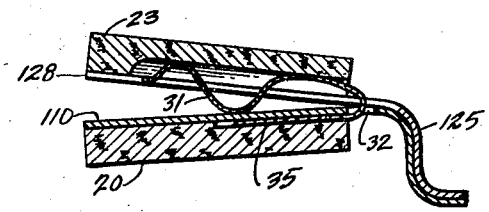
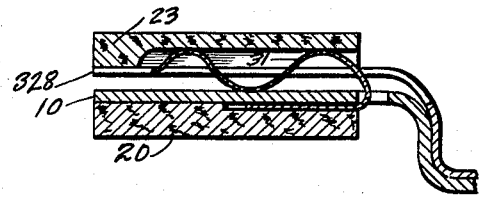
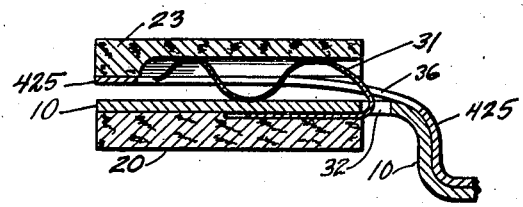
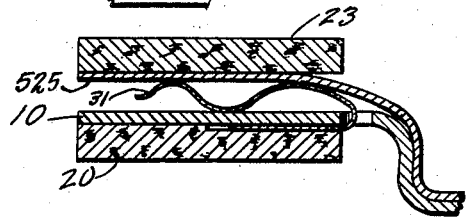

Patented June 15, 1943

2,321,821

UNITED STATES PATENT OFFICE 2,321,821

DRIVEN MEMBER FOR FRICTION CLUTCHES

Morris Katcher, New York, N. Y.

Application October 4, 1939, Serial No. 297,780

9 Claims. (Cl. 192—107)

This invention relates to a driven member for friction clutches of the kind wherein the driven member is interposed between two parts of a driving member and is adapted to be gripped or clamped by the parts under sufficient pressure to impart motion from the driving member to the driven member. The invention is particularly desirable in a friction clutch for automobiles.

An object of this invention is to provide means which shall be sufficiently yieldable to effect gradually the friction grip between the parts of the driving member and the friction facings of the driven member. This is effected by mounting one of the friction facings flat on the solid disc of the driven member, while the other facing is mounted on an annular auxiliary plate attached to the disc with openings or radial slots in the plate in which are set cushion members or springs reacting between the latter facing and the disc, yieldingly holding the latter facing away from the disc. By cutting radial slots in the plate, spokes are formed therein. When the springs, auxiliary plate and latter facing are mounted on the disc, the spokes, which have said facing attached to them, are forced against their resiliency away from the disc by the reaction of the springs against said facing.

The mounting of the disc on the hub is similar to the hub construction described in my Patent No. 2,076,373.

The advantage of my construction over that of previous constructions, in which a single disc is used with spokes alternately and oppositely bent out from the plane thereof, is that I use a solid disc, that is one not having any spokes. The advantage of this over the spoked disc, is that there is less likelihood of the disc to be warped as originally manufactured and afterwards when subject to continued use. A spoked disc with originally bent out spokes, is likely to be warped as manufactured, and later on under continued use to be distorted by the constant bending and unbending of the spokes. It is true that the auxiliary plate I use is preferably spoked, however, as it is of lighter gauge than the disc and riveted flat thereto, the latter will help to hold it in shape.

Other objects and advantages will become apparent upon a further study of the description and drawings, in which:

Fig. 1 is a plan view of the driven member with the spoked plate, disc and a friction facing partly cut away to expose the parts beneath.

Fig. 2 is a partial section taken along the line 2—2 of Fig. 1.

Fig. 3 is a partial section taken along the line 3—3 of Fig. 1.

Fig. 4 is a partial section taken along the line 4—4 of Fig. 1.

Fig. 5 is a fragmental plan view of the driven member showing a modified form of spoked auxiliary plate.

Fig. 6 is a partial section to a larger scale taken along a line similar to line 2—2 in Fig. 1 and shows a modification of the device in which the spoked plate is of relatively heavier gauge than in Fig. 2 causing the spokes, under the action of the springs, to be bent differently from that shown in Fig. 2.

Fig. 7 is a partial section to a larger scale taken similarly to Fig. 6 and shows a modification of the device in which the gauge of the spoked plate and disc are substantially the same.

Fig. 8 is a partial section to a larger scale taken similarly to Fig. 6 and shows a modification in which the plate is permanently bent before being attached to the disc so that when fastened to the disc it normally stands away from the disc, and preferably parallel thereto, at its peripheral portion.

Fig. 9 is a partial section to a larger scale taken similarly to Fig. 6 and shows a modification in which the plate, instead of being spoked as in Fig. 2, has only openings for the cushion members or springs, and Fig. 10 is a partial section to a larger scale taken similarly to Fig. 6 and shows a modification in which the springs come between the plate and the disc, without the springs passing through cut away portions of the plate, into direct contact with the friction facing.

Hub 6 is provided with keyways 7 for splining it to a shaft. The flange portion 17 of hub 6 has a number of semi-cylindrical housings 8 pressed therefrom which thereby form a covering over openings in said flange portion, one of said openings being shown at 18, Fig. 3. Overlapping and attached to flange 17 by means of shouldered rievts 9, is a disc 10 with its auxiliary spoked plate 25. Auxiliary plate 25 is fastened to disc 10 by means of rivets 26. The slots 27 in plate 25 give rise to spokes 28. Plate 25 is considerably thinner than dics 10 in my preferred form, said disc being of substantial thickness. Each rivet 9 is fixedly attached to flange 17 which is gripped between the small head of the rivet and shoulder 19. The shoulder 19 of each rivet 9 has a sliding fit in an elongated arcuate slot 11 in disc 10 and plate 25 and is concentric with the hub, the large head of the rivet being slidable with respect to the outer surface of plate 25 adjacent the slot. The sliding of rivets 9 in elongated slots 11 permits of a limited relative rotation between hub member 6 and disc 10 with its auxiliary plate 25.

The limited relative rotation between the hub and disc 10 with its auxiliary plate 25 together with springs 12, as will be explained, provide a cushioning effect between the driving action of the disc and flange 17. Disc 10 is provided with a number of oblong openings 13 in which springs 12 are located. Housings 15 are provided on disc 10 at openings 13 for retaining springs 12. The openings 18 in flange 17 and the openings 13 in disc 10 contain springs 12.

As disc 10 starts to rotate, through the play provided by the sliding of rivets 9 in slots 11, springs 12 are pressed against by one of the short edges of openings 13 in disc 10. The other end of said springs reacts against the opposite edge of openings 18 in flange 17. Continued rotation of disc 10, compresses springs 12 until they develop enough resistance to rotate hub 6 along with disc 10. In the form of my driven member shown in Figs. 1–4, auxiliary plate 25 is notched out around housing 15 of disc 10, and is provided with slots 11.

Friction facing 20 is riveted to disc 10 by means of rivets 21. Disc 10 is countersunk to receive the heads of rivets 21. Opposite rivets 21, holes 22 are provided for the bucking up tool used in the driving of rivets 21. Friction facing 23 is attached to spokes 28 of auxiliary plate 25 by means of rivets 24. Because of its thinness, plate 25 cannot be countersunk for the heads of rivets 24. Accordingly, the heads of rivets 24 project, but only such an amount as will come within the thickness of disc 10 at holes 29 provided therefor. A hole 30 is provided in facing 20 for the bucking up tool for rivets 24.

Facing 23 is held away from disc 10 and with it spokes 28, by the wavy legs of hair-pin springs 31. Each spring is held in place on disc 10 by having its head pass through an opening 32 in said disc. One leg 35 of spring 31 is flat while the other is substantially wavy shaped. While wavy shaped is my preferred form, it will be readily understood that other shapes could be used as well. Friction facing 20 is provided with recesses 33 to receive the flat legs of springs 31. Friction facing 23 is provided with deeper recesses 34 to accommodate the wavy legs of springs 31. The wavy legs of springs 31 are nested in slots or cut-away areas 27 of plate 25 and react between disc 10 and the inside of facing 23 at recesses 34. Were it not for springs 31, spokes 28 would lie against disc 10. The stiffness of facing 23 between where it is fastened to spokes 28 by rivets 24 is sufficient to pull spokes 28 against their resiliency away from disc 10, as facing 23 is held away therefrom by the wavy legs of springs 31. This is my preferred form, but it is within the scope of my invention to make disc 10 of thin metal of substantially the same thickness as that of plate 25, in which case, instead of forcing spokes 28 and facing 23 away from the original plane of disc 10, that is, instead of having all the pushing out from said disc by springs 31 occurring in spokes 28 and facing 23, said pushing out will be divided between the latter and disc 10 with its facing 20. This will be more fully explained in connection with Fig. 7.

In the modification shown in Fig. 7, the disc 110 and plate 125 with its spokes 128, are of substantially the same thickness. Facing 23 is carried by spokes 128 and facing 20 by disc 110. In this case, therefore, instead of disc 110 remaining unbent, as disc 10 in Fig. 2, both the disc 110 and spokes 128 are bent out against their resiliency from their original plane by springs 31. As in the case of Fig. 2, spokes 128 and disc 110 would lie against each other were it not for springs 31 pushing them apart. The advantage in both cases of having the spokes and disc normally set to be against each other, is that during the heating of the clutch from use, their tendency to warp will produce a less spreading apart than if they were not biased to set against each other.

In Figs. 1–3, the spokes 28 are relatively less stiff than friction facing 23, that the spokes are caused to start bending at rivets 24, while friction facing 23 is held substantially parallel to disc 10 by springs 31. In the modified form shown in Fig. 6, however, the spoke 228 is stiffer than spoke 28 of Fig. 3, so that the pushing out of friction facing 23 by spring 31 from disc 10 will cause said friction facing to have a conical surface, that is the friction facing will be given the distortion instead of having the spokes bend about rivets 24 as in Fig. 3.

Instead of my preferred form, as shown in Figs. 1–4, in which disc 10 and plate 25 and its spokes 28 are pushed out from disc 10 against their resiliency by means of springs 31, I could use a construction, as shown in Fig. 8 in which the spokes 328, which carry friction facing 23 are originally bent out by forging or stamping before assembling so that they will set out from the plane of disc 10 independently of springs 31. In this case, when in the operation of the clutch, the friction facings 20 and 23 are squeezed between the two parts of the driving member of the clutch, not shown, the resistance to bending of the spokes, such as shown at 328, plus that of springs 31, cushion the engagement of the clutch. In all the other figures shown, however, the spokes subtract from the cushioning effect of the springs, as said spokes are acted upon by the springs to hold them against their resiliency away from disc 10. This loss of cushioning action is kept small by making the spokes and auxiliary plate thin, in fact they need only be thick enough to have sufficient strength to transmit to disc 10, the rotating effect received from friction facing 23 when the clutch is in engagement.

In the modification shown in Fig. 9, there are no spokes, the friction facing 23 being carried by auxiliary plate 425 provided with openings 36 for springs 31 to pass through into contact with friction facing 23, to keep the latter and plate 425 away from disc 10 to cushion the engagement of the clutch.

In the modification shown in Fig. 10, no openings or other cut away portions are provided in auxiliary plate 525 for springs 31 to pass through into contact with friction facing 23. Here springs 31 react between disc 10 and plate 525 to hold them apart. Plate 525 may or may not be provided with slots, such as those shown at 27, Fig. 1, for giving it spokes. If slots are provided, they are located elsewhere than at springs 31.

In all the modifications shown, except Fig. 9, my preferred form is to provide slots such as shown at 27, Fig. 1, so that the auxiliary plate is spoked. I wish it to be understood, however, that the auxiliary plate need not be spoked.

In the modification shown in Fig. 5, auxiliary plate 625, instead of being provided with slots 11 to accommodate rivets 9 as in Figs. 1 and 2, is notched out at 37 to clear the heads of rivets 9. Plate 625 is welded to disc 10 between notches 37 instead of using the rivets 26 seen in Figs. 1 and 3.

I claim:

1. A driven member for a friction clutch comprising a relatively thick metal disc, a plate of relatively thin metal mounted on said disc, being attached thereto at the inner portion of the plate, cushion members mounted between the peripheral portions of the disc and plate, a friction facing fastened to the disc at its peripheral portion on the side away from said plate, and a second friction facing fastened to the plate at its peripheral portion on the side away from said disc, said cushion members bending the plate against the resilience of the latter away from the disc, the thickness of the disc being sufficient to maintain the disc against flexure, said bending occurring in the plate.

2. A driven member for a friction clutch comprising a relatively thick disc, a relatively thin resilient plate, provided with spaced peripheral spokes, attached to said disc, a friction facing fastened to the disc at its peripheral portion on its side away from the plate, a second friction facing fastened to the spokes on their side away from the disc, cushion members mounted on the disc at its peripheral portion and extending through the plate into contact with the second friction facing, yieldingly holding the latter away from the disc and bending the spokes away from the disc against their resilience, the stiffness of the spokes being less than that of said second facing between successive spokes to which it is attached, said cushion members also being of greater stiffness than the spokes, the thickness of the disc being sufficient to maintain it against flexure.

3. A driven member for a friction clutch comprising a relatively thick disc, a relatively thin resilient plate attached to the disc at its inner portion, a friction facing fastened to the disc at its peripheral portion on its side away from the plate, a second friction facing fastened to the plate at its peripheral portion on its side away from the disc, springs located at intervals around the peripheral portion of the disc, each spring having a pair of legs joined together by a head, the legs of each spring being on opposite sides of the disc, the heads of the springs passing through openings provided in the disc, at least one leg of each spring being curved, said curved leg being located on the side of the disc toward said plate, yieldingly maintaining the latter away from the disc, the thickness of the disc being sufficient to maintain it against flexure.

4. A driven member for a friction clutch comprising a relatively thick disc, a relatively thin plate, provided with peripheral spokes, attached to said disc at the inner portion of the plate, a friction facing fastened to the disc at its peripheral portion on its side away from the plate, a second friction facing fastened to the spokes on their side away from the disc, and cushion members set between the peripheral portions of the disc and the plate for yieldingly resisting the squeezing together of the spokes and disc, the thickness of the disc being sufficient to enable it to resist the squeezing without bending, the bending due to squeezing occurring in the plate.

5. A driven member for a friction clutch comprising a relatively thick disc, a relatively thin plate, provided with peripheral spokes, attached to said disc at its inner portion, a friction facing fastened to the disc at its peripheral portion on its side away from the plate, a second friction facing fastened to the spokes on their side away from the disc, and plate springs located at intervals around the peripheral portion of the disc, each spring having a pair of legs joined together at one end, the legs of each spring being on opposite sides of the disc, said joined together ends passing through openings provided in the disc, the legs of the springs, located on the side of the disc toward said plate, being curved and stiffer than the spokes, said latter legs yieldingly resisting the squeezing together of the spokes and the disc, the thickness of the disc being sufficient to enable it to resist the squeezing without bending, the bending due to squeezing occurring in the plate.

6. A driven member for a friction clutch comprising a relatively thick disc, a relatively thin plate, said plate and disc attached to each other at their inner portions, the outer portion of the plate being free to bend to and from the disc, a friction facing fastened to the disc at its peripheral portion on its side away from the plate, a second friction facing fastened to the plate on its side away from the disc, said plate being initially bent to set without stress from the disc so that its outer portion is substantially parallel to the disc and spaced therefrom, and cushion members between the disc and plate to hold the latter yieldingly in said spaced relation, to cushion the engagement of the friction facings during the operation of the clutch, the thickness of the disc being sufficient to maintain it against bending due to said engagement, said bending occurring in the plate.

7. A driven member for a friction clutch comprising a relatively thick disc, a relatively thin plate, provided with substantially spaced peripheral spokes, attached to said disc at the inner portion of the plate, a friction facing fastened to the disc at its peripheral portion on its side away from the plate, a second friction facing fastened to the spokes on their side away from the disc, and cushion members set around the peripheral portion of the disc at the space between the spokes, extending between the disc and the facing on the spokes for yieldingly resisting the squeezing together of the spokes and disc, the thickness of the disc being sufficient to enable it to resist the squeezing without bending, the bending due to squeezing occurring in the plate.

8. A driven member for a friction clutch comprising a relatively thick disc without spokes, a relatively thin plate attached to said disc at the inner portion of the plate, a friction facing fastened to the disc at its peripheral portion on its side away from the plate, a second friction facing fastened to the plate at its peripheral portion on its side away from the disc, and cushion means set around the peripheral portion of the disc on the side of the latter toward the plate for yieldingly resisting the squeezing together of the plate and disc, the thickness of the disc being sufficient to enable it to resist the squeezing without bending, the bending due to squeezing occurring in the plate.

9. A driven member for a friction clutch comprising a relatively stiff disc, a relatively flexible plate attached to said disc, the attaching being at the inner portions of the disc and plate, a friction facing fastened to the disc at its peripheral portion on its side away from the plate, a second friction facing fastened to the plate on its side away from the disc, and cushion members between the peripheral portions of the disc and the plate for yieldingly resisting the squeezing together of the disc and the plate at said portions, the stiffness of the disc being sufficient to enable it to resist the squeezing substantially without bending, the bending due to said squeezing occurring substantially all in the plate.

MORRIS KATCHER.